United States Patent [19]
DiFonso et al.

[11] Patent Number: 5,277,125
[45] Date of Patent: Jan. 11, 1994

[54] MATERIAL HANDLING CAR AND TRACK ASSEMBLY HAVING OPPOSED MAGNET LINEAR MOTOR DRIVE AND OPPOSED PERMANENT MAGNET BRAKE ASSEMBLY

[75] Inventors: Gene DiFonso, Arlington; Joel L. Staehs, DeSoto, both of Tex.

[73] Assignee: BAE Automated Systems, Inc., Carrollton, Tex.

[21] Appl. No.: 967,661

[22] Filed: Oct. 28, 1992

[51] Int. Cl.$^5$ .............................................. B60L 13/02
[52] U.S. Cl. ................................. 104/292; 104/294; 188/158; 188/267
[58] Field of Search ............... 104/290, 292, 283, 294; 188/267, 158

[56] References Cited

U.S. PATENT DOCUMENTS

| | | | |
|---|---|---|---|
| 4,613,805 | 9/1986 | Matsuo et al. | 318/687 |
| 4,848,242 | 7/1989 | Matsuo | 104/290 |
| 4,919,054 | 4/1990 | Matsuo | 104/94 |
| 5,018,928 | 5/1991 | Hartlepp | 414/339 |
| 5,127,599 | 7/1992 | Veraart | 104/292 X |

FOREIGN PATENT DOCUMENTS

| | | | |
|---|---|---|---|
| 81105 | 4/1986 | Japan | 104/292 |
| 177101 | 8/1986 | Japan | 104/292 |
| 231804 | 10/1986 | Japan | 104/292 |

*Primary Examiner*—Robert J. Oberleitner
*Assistant Examiner*—S. Joseph Morano
*Attorney, Agent, or Firm*—Lorusso & Loud

[57] ABSTRACT

Material handling car and track assembly, the assembly comprising a car having wheels mounted thereon, and a track having two parallel rails, the wheels being adapted to roll on the rails to facilitate movement of the car along the track, a metal slider extending from an underside of the car and lengthwise of the car, and opposed linear motors mounted beween the tracks and spaced from each other to define a gap between the motors, the slider being daapted to pass through the gap, the motors being operative to act on the slider to impart thrust to the car, the motors being oriented such as to substantially eliminate magnetic atraction between the mtors and the car. The invention further contemplates opposied magents mountede beween the tracks and spaced from each other to define a gap between the magnets, the slider being dapted to pass through the gap between the magnets, the magnets being operative to act on the slider to impart braking to the car, whereby to decelerate the car.

3 Claims, 3 Drawing Sheets

MATERIAL HANDLING CAR AND TRACK ASSEMBLY HAVING OPPOSED MAGNET LINEAR MOTOR DRIVE AND OPPOSED PERMANENT MAGNET BRAKE ASSEMBLY

BACKGROUND OF THE INVENTION

1. Field of the Invention

The present invention relates to a material handling car and track assembly and is directed more particularly to acceleration and deceleration means mounted in the track assembly and adapted to influence speed of the car.

2. Description of Prior Art

The prior ar has recognized the need for means to propel a car along a track without the installation of a driver mechanism or braking mechanism on the car. Systems have incorporated linear induction motors as an efficient means of achieving this. Such systems commonly employ single motors along a track whereby a car is propelled by a force created by the change in magnetic flux as the car passes by the motors. However, a problem inherent in these systems is that of undue stress on the cars and tracks themselves due to an electromagnetic force created between the car and the motor, causing the car to be attracted toward the track. This attractive force exerted on the car dissipates after the car passes away from the motor. In systems where there are commonly several hundred motors in use through which a car passes as it travels through the system, the constant attractive stress and release of such stress, leads to wear and tear on the car. As a result, cars break down and are in need of frequent repair.

Such a system is disclosed in U.S. Pat. No. 4,919,054 to Matsuo. In this system, linear induction motors are disposed in single file underneath the transport path of the car, causing the motors to exert an attractive force while acting to drive the car. Due to numerous motors in the system, a car undergoing such repeated application and release of stress becomes structurally weak and requires frequent servicing.

Another problem recognized in the prior art relates to providing a means for controlling the speed of a car through the use of a decelerating mechanism external of the car. Many systems which have employed inductive motors to impel a car forward along a track have relied entirely upon the same motors for braking the car. A reverse thrust is applied to the car by passing reverse phase alternating current through the coils of the motor stators, to slow the car down. However, these systems potentially overwork the motors which often leads to motor failure.

An example of this type of system is disclosed in U.S. Pat. No. 4,848,242 to Matsuo. As in the Matsuo '054 system, single motors are disposed at predetermined intervals underneath the transport path and, as in the previous system, an attractive force on the car is exerted and released as the car moves in the direction of the transport path. The motors impel the car in the forward and reverse directions. Thus, the motors carry out the function of starting and stopping the car, depending on the direction of current flow. However, this dual function leads to increased wear and tear on the motors.

In other systems, such as disclosed in U.S. Pat. No. 5,018,928 to Hartlepp, a car is decelerated through the use of a magnetic piston which moves by compressed air in a tube, such that a car will follow the piston. However, the use of such a structure is complicated and thus provides great opportunity for malfunction. Additionally, this system discloses the use of linear induction motors for propelling a car on a track wherein induction motors are singly disposed. Accordingly, an attractive force is exerted on the cars driven by the motor.

An additional problem recognized in the art is the need to mitigate the effects of motor failure. In U.S. Pat. No. 4,613,805 to Matsuo, there is disclosed a system providing for continued operation through the use of an auxiliary power source in the event that the main power source becomes disabled. However, this system does not insure continued operation in the event that a motor along the transport path should become disabled.

SUMMARY OF THE INVENTION

Accordingly, it is an object of the invention to provide a material handling car and track assembly which reduces wear and tear on cars traveling through the system and provides for continued operation in the event that a motor, or several motors, in the system become disabled. This object is accomplished by provision of a car having a metal slider on the underside of the car. The assembly further includes a track having two parallel rails. Movement is imparted to a car traveling on the rails by opposed linear motors operatively acting on the slider. The configuration of the motors is such that it causes the magnetic attraction between the linear motors and the car to substantially cancel out, thereby eliminating the attractive force on the car. Thus the cars, no longer subject to application and release of stresses, require less reparative maintenance and enjoy longer operating life. Additionally, through the use of coupled motors, should one motor become disabled, the remaining motor continues to impart motion until the afflicted motor is again operative.

A further object of the invention is to provide a simple means for decelerating the car without the use of mechanisms disposed on the car. The use of magnets disposed along the track enables the car's traveling speed to be decreased, the magnets operatively acting on the slider to decelerate the car.

With the above and other objects in view, as will herein after appear, a feature of the present invention is the provision of a material handling car and track assembly, the assembly comprising a car having wheels mounted thereon, and a track having two parallel rails, the wheels being adapted to roll on the rails to facilitate movement of the car along the track, a metal slider extending from an underside of the car and lengthwise of the car, and opposed linear motors mounted between the tracks, the motors being spaced from each other by a distance exceeding the thickness of the slider to define a gap between the motors, the slider being adapted to pass through the gap in travel of the car over the motors, the motors being operative to act on the slider to impart thrust to the car, the motors being oriented such as to substantially eliminate magnetic attraction between the motors and the car.

In accordance with a further feature of the invention, there is provided a material handling car and track assembly, the assembly comprising a car having wheels mounted thereon, and a track having two parallel rails, the wheels being adapted to roll on the rails to facilitate movement of the car along the track, a metal slider extending from an underside of the car and lengthwise of the car, and exposed magnets mounted between the tracks, the magnets being spaced from each other by a distance exceeding the thickness of the slider to define a gap between the magnets, the slider being adapted to pass through the gap in travel of the car over the magnets, the magnets being operative to act on the slider to impart braking to the car, whereby the magnets are operative to decelerate the car.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the accompanying drawings.

DESCRIPTION OF THE PREFERRED EMBODIMENTS

Figure 1:
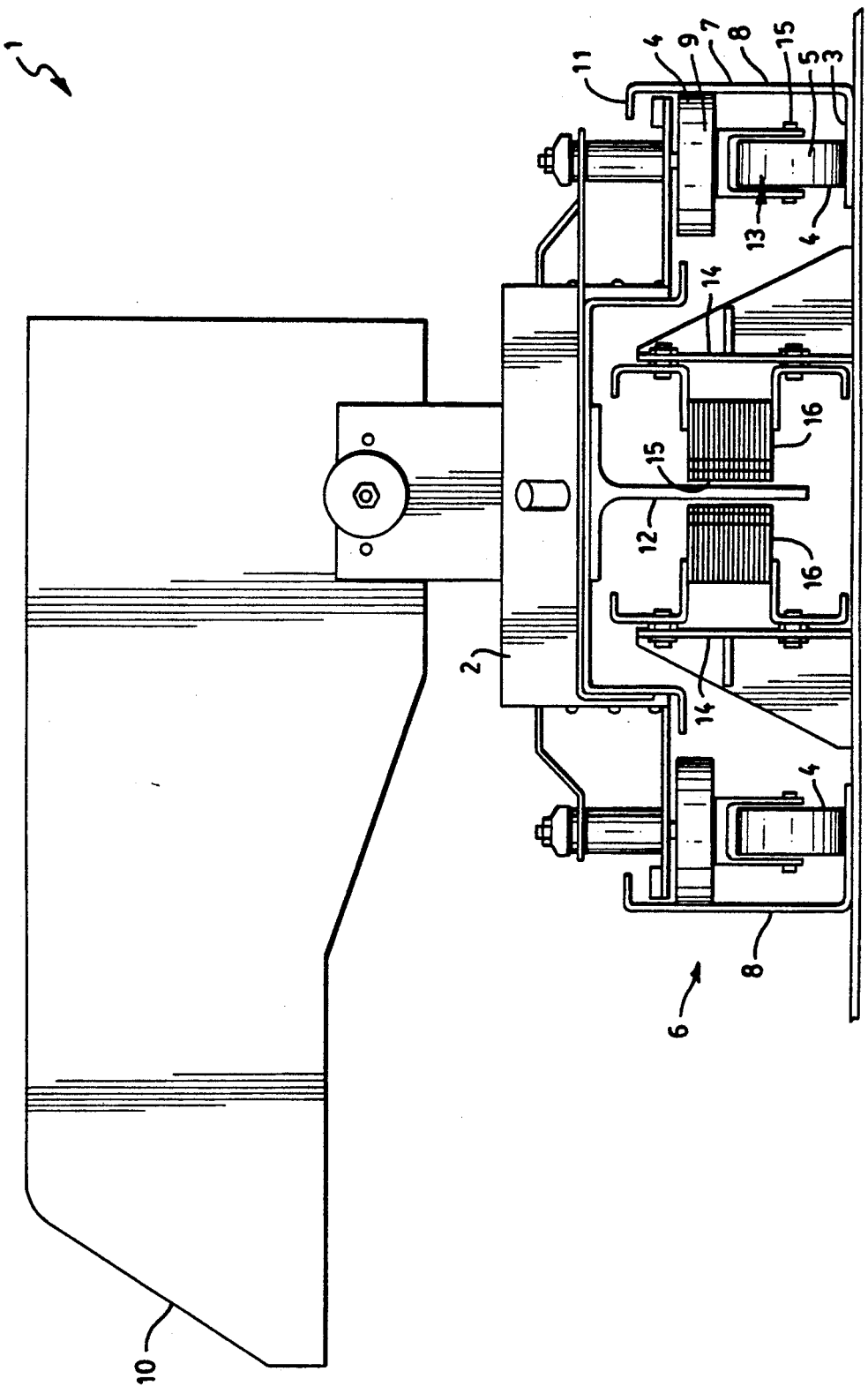
FIG. 1 is a front elevational view of one form of material handling car and track assembly illustrative of an embodiment of the invention, wherein the material handling car is shown having a metal slider on an underside portion of the car, and the track assembly is shown with linear induction motors in opposition, forming a gap therebetween to accommodate the passage of the slider.

Referring to FIG. 1, it will be seen that the illustrative assembly includes a car 1 having a chassis 2 on which are mounted travel wheels 4 to facilitate movement along a track assembly 6, which comprises two parallel rails 8.

Each of the rails 8 is of a U-shaped configuration and, as shown in FIG. 1, are opposed to each otherl Each of the U-shaped rails includes a substnatially horizontal bottom plae 3, for supporting a vertical travel wheel 5 of the car 1, and a substnatially ertical wall 7 for engagin a horizonal tavel wheel 9 of car 1, and a top wall 11 overlyin the bottom plate 3 and extending iwnardly from eside wall 7. Mounted on the chassis 2 is a tiltable tray 10 which is sized to accommodate a selected cargo, such as, for example, heavy, large or cumbersome baggage. The tray 10 is capable of being positioned in three positions, one in which it is adapted to receive material from a loading station, another in which it permits transport of material around curves in the track without spillage of material, and lastly, a third position in which it facilitates sliding of the material off the tray 10 onto a receiving platform.

On the underside of the chassis 2, a slider 12 is mounted which runs lengthwise along the chassis 2. The slider 12 comprises a fin which is preferably fabricated of an all-conductor, such as aluminum or copper. Other all-conductive materials are within the scope of the preferable materials, provided that such materials are non-magnetic. The use of such materials reduces the overall weight of the car so that it is 25% to 30% less than existing prior art cars which do not employ such materials. The slider 12 is preferably 0.25 inch thick and in one embodiment is 48 inches long.

Also shown in FIG. 1 is a track assembly with linear induction motors 16 disposed in opposition. Brackets 14 are disposed inwardly of the rails 8, and are adapted to retain the linear induction motors 16 such that the motors 16 form a gap 15 sized to be greater than the width of the slider 12. The two brackets 14 each hold a linear induction motor 16 in such an orientation that the motors extend to form the narrow gap 15 therebetween.

Figure 3:
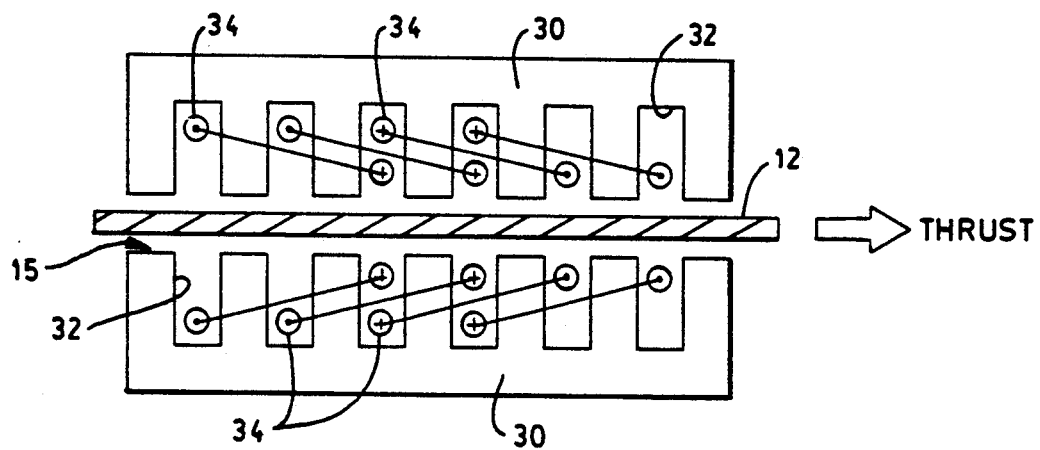
FIG. 3 is a diagrammatic view of two opposed linear motors.

The linear induction motors 16 each include a stator assembly 30 (FIG. 3) having slots 32 therein. Within each stator assembly 30, there are disposed multiple phase windings 34. The windings 34 are disposed in the slots 32 so as to form a distributed winding pattern. When excited by a multiple phase alternating current source (not shown), the windings 34 generate a traveling magnetic wave defined by $$b = B \cos \frac{(\pi S)}{p}$$

where
B = peak value of magnetic flux density in air gap
S = lengthwise distance of stator gap
p = pole pitch of stator Inasmuch as the conductive slider 12 consists entirely of non-magnetic material, no force is produced tending to pull the slider sideways.

Because of magnetic induction action between the air gap magnetic flux wave and the slider, there occurs a flow of eddy currents defined by $$j = J \sin \frac{(\pi S)}{p}$$

where
J = peak value of eddy current flow in the slider.

Interaction between the air gap flux wave and resulting eddy currents induced on the slider, produces thrust in the direction orthogonal to both flux and eddy current waves. The coil polarities are reversed from one stator assembly to the opposing stator assembly across the gap 15. As a result of this configuration, the attractive force created by single non-opposed stators is eliminated.

Referring to FIG. 1, it will be seen th the motors 16 are on about the same level above the botom plates 3 as are the horizontal travel wheels 9 and portions 13 of the ertical travel wheels 5 above their axes 15, when h car passes over the motors. Thus, as is paparent from FIG. 1, the driving force imparted to the slider 12 by the motors 16 is on about the same level as the horizontal wheels and the portion of the vertical wheels above the vertical wheel axes. Thus, there is produced subsntially only a forward thrust, without a turning moment imparted to the travel wheels tending to lift the wheels off the track.

In operation, the motors may be run continuously or may be provided with selective turn-off switches, such that one or more groups of motors may be turned off during periods of inactivity. Alternatively, a "presence control" may be utilized wherein the approach of a car is sensed and the motors turned on and, as the departure of the car from the scene is sensed, the motors turned off. A second alternative comprises a "speed control" wherein the speed of an approaching car is sensed and the motors are activated or deactivated in accordance with a preset desired speed for the car.

Figure 2A:
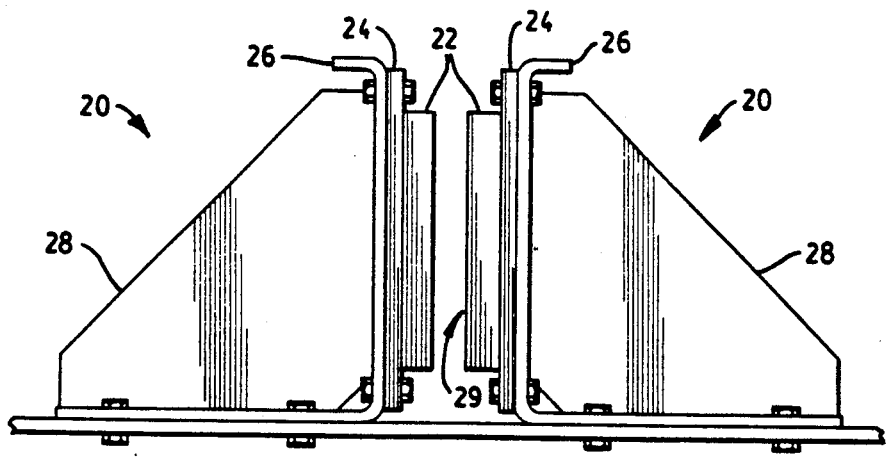
FIG. 2A is a front elevational view of a decelerating means featuring decelerating magnets arranged in opposition and forming a gap therebetween adapted to accommodate the passage of the slider.

In FIG. 2A, there are shown decelerating magnetic members 20. Individual magnets 22 are each bonded to a steel plate 24 for support. The steel plates 24 are each attached to a mounting bracket 26. Steel gussets 28 (FIGS. 2A and 2B), each about 0.25 inch thick, are mounted across an inner angle of the mounting brackets 26, to provide support for the brackets 26. The magnetic members 20 are positioned between the rails 8 so as to form a gap 29, the width of which is greater than the width of the slider 12.

Figure 2B:
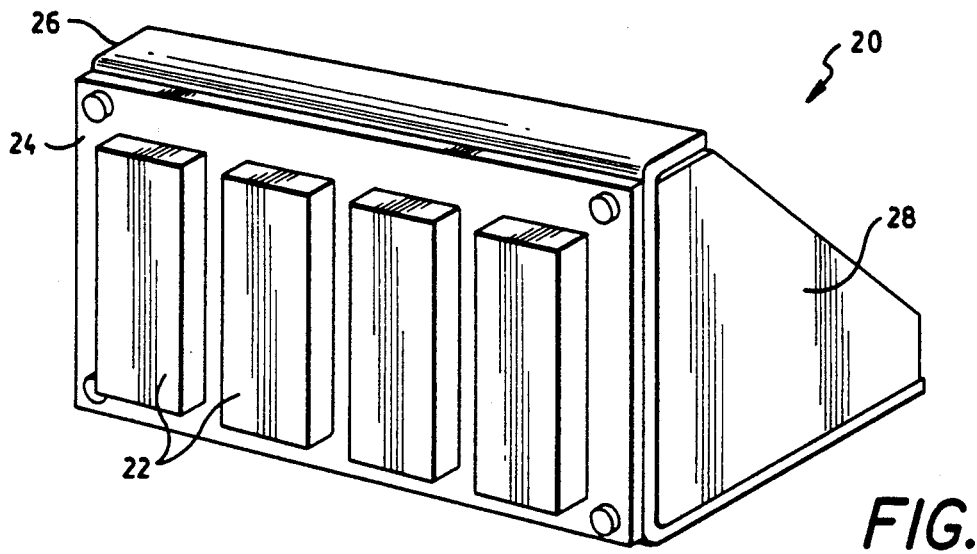
FIG. 2B is a perspective view of a portion of the decelerating means of FIG. 2A.
Figure 2C:
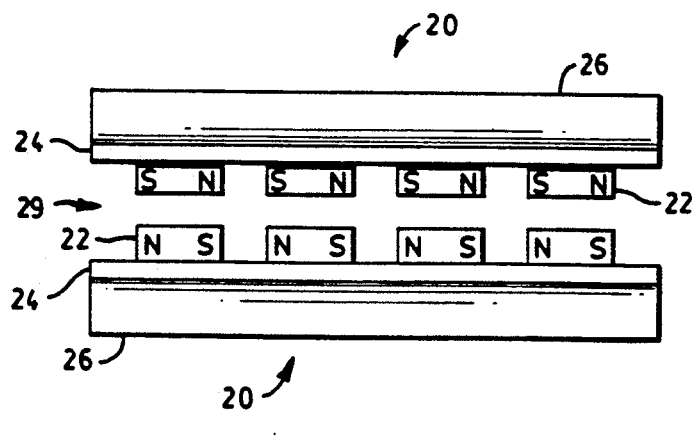
FIG. 2C is a top view of a portion of the decelerating means of FIG. 2A, showing the polar arrangement of magnets therein.

FIG. 2B shows the inner face of one of the identical opposed magnets and the positioning of the individual magnets 22. A selected number of magnets, depending upon the weight and desired velocity of the vehicle, are placed on each of the steel plates 24. FIG. 2C shows the magnets 22 and the polar orientation thereof. Thus, when the slider 12 passes between the magnetic members 20, as the car 1 travels along the tracks, the magnetic field created by the opposed polar orientation of individual magnets 22, serves to decelerate the car 1.

On the track assembly, the magnetic members 20 and the induction motors 16 are disposed in certain places where it is desirable that the speed of the car be either slowed or maintained. For example, in areas of an incline where it is likely that car speed will decrease, the induction motors may be disposed to maintain an appropriate speed. There are places along the track assembly where it is desirable that the speed of the car be decreased, such as in areas of sharp turns. It is in such areas that the magnetic members may be disposed to slow the car. Additionally, in areas where baggage is to be loaded onto and off of the tray of the car, magnetic members are disposed. Also, in areas where the tray has finished loading or unloading baggage, induction motors may be positioned, so as to move the car along the track system and return the car to travel speed.

The motors may be reversed by merely reversing the direction of the traveling magnetic wave. This is accomplished by changing the phase rotation of the multiple phase power source, to provide a braking force on the cars. While it is preferable not to rely wholly on the motors for routine braking, use of the motors for braking over and beyond that provided by the magnetic members 20 is available.

It should be understood that the invention is not limited to the specific embodiment or construction described above and that various changes and modifications will be obvious to one skilled in the art without departing from the true spirit and scope of the invention as defined in the appended claims.

What is claimed is:

1. A track assembly for driving a material handling car, said asembly comprisin:
   two parallel rails upon which said car is driven, each of said rails havign a U-shaped configuration, said rails being in opposed position, each of said rails having a subsntaially horizontal bottom plate for supporting a vertical travel wheel of said car, a substantially vertical side all for engaging a horizonal travel wheel of said car, and a top wall overlying said bottom plate and extending iwnardly from said side wall
   linear induction motors mounted between said rails in an opposed configguration, said motors being on about the same level above said rail bottomplates as said horizontal travel wheel and portions of said vertical tarvel wheels above the axes thereof when said car passes over said motors, said opposed configuration defining a gap beween said motors permiting passage of a slider portion of said car therebetween, said configuration creating a driving force for impellin said car along said rails while causing cancellation of atractive forces exerted by seach of said induction motors respectively, such that said slider upon passage through said gap is subject only to said driving forcek said driving force being exerted by said motors at said level above said rail bottom plates so as to provide said driving force at said level of said horizontal travel wheels and said portions of said vertical travel wheels above said axes thereof, and
   permanent magnets mounted between said rails at a point removed from said motors, said magnets being mounted in an opposed configuration defining a gap between said magnets which permits the passage of said slider therbetween, said magnets being adapted to exercise a braking force on said slider to decrease the speed of said car upon passage of said slider therebetween.

2. A material handling car and track assembly, said assembly comprising
   a car having wheels mounted thereon, and a track having two parallel rails, said wheel being adapted to rolll on said rails to faciliate movement of said car along said track, a metal fin extending from an underside of said car and lengthwise of said car, said fin exending from said car between said wheels and
   opposed linear motors mounted between said tracks, said motors being spaced from each other by a distance exceeding the thickness of said fin to define a gap between said motors, said fin being adapted to pass through said gap in travel of said car over said motors said motors being oriented such as to substanatially eliminate magentic attraction between said motors and said car, and said motors bieng disposed between said wheels when said car passes over said motors, said moors being disposed at a level above bottom plates of said track rails and genraly equal to the level of portions of said wheels above said bottom plates and above the axes of said wheels when said car passes over said motors, and
   opposed permanent mgents mounted between said tracks at a point removed from said motors, said magnets being spaced from each other by a distance exceedig the thickness of said fin to define a gap between said magnets, said fin being adapted to pass through said gap between said magnets in travel of said car over said magnets, said magnets being disposed on plates mounted between said tracks, said magnets being mounted side by side in a direction of travel of said car, said magnets being operative sequentially to act on said fin to impart braking to said car, whereby said motors are operative to accelerate said car and said magnets are operative to decelerate said car.

3. Material handling car and track assembly, said assembly comprising:
- a car having wheels mounted thereon, and
- a track having two parallel rails, said wheel being adapted to roll on said rails to facilitate movement of said car along said track,
- a metal fin extending from an underside of said car and lengthwise of said car, and
- opposed magnet assemblies mounted between said tracks, said opposed assemblies being spaced from each other by a distance exceeding the thickness of said fin to define a gap between said magnet asemblies, said fin being adapted to pass through said gap in travel of said car over said magnets, each of said assemble is comprising a mounting bracket, a plate attached to said mounting bracket, and a series of magnets bonded to said plate, said magnets on said plate being disposed side by side in a direction of travel of said car on said rails, said magnets being operative sequentially to act on said fin to impart braking to said car.

* * * * *

UNITED STATES PATENT AND TRADEMARK OFFICE
CERTIFICATE OF CORRECTION

PATENT NO. : 5,277,125

DATED : January 11, 1994

INVENTOR(S) : Gene DiFonso, Joel L. Staehs

Page 1 of 2

It is certified that error appears in the above-indentified patent and that said Letters Patent is hereby corrected as shown below:

In the Abstract:

Line 9: "daapted" should read "adapted"
    Line 13: "mtors" should read "motors"
    Line 14: "opposied" should read "opposed"
          "magents" should read "magnets"
          "mountede" should read "mounted"
    Line 16: "dapted" should read "adapted"

Column 1: line 9; "fnvention" should read "invention"
Column 1: line 15; "ar" should read "art"

Column 3: line 53; "l" should read "."
         line 54; "substnatially" should read —substantially—
         line 55; "plae" should read —plate—
         line 56; "substantially ertical" should read
                 —substantially vertical"
        line 56; "engagin" should read "engaging"
        line 57; "tavel" should read "travel"
        line 58; "overlyin" should read "overlying"
        line 59; "eside" should read "the side"
Column 4: line 11; "48" should not be in bold
        line 57; "th" should read "that"
        line 58; "botom" should read "bottom"
        line 60; "ertical" should read "vertical"
        line 60; "h" should read "the"
        line 61; "paperent" should read "apparent"
        line 65; "substntially" should read "substantially"
Column 5: line 64; "asembly comprisin" should read "assembly
                comprising"
        line 66; "havign" should read "having"
        line 68; "substntaially" should read "substantially"

UNITED STATES PATENT AND TRADEMARK OFFICE
CERTIFICATE OF CORRECTION

PATENT NO. : 5,277,125　　　　　　　　　　　　　Page 2 of 2
DATED　　　 : January 11, 1994
INVENTOR(S) : Gene DiFonso, Joel L. Staehs It is certified that error appears in the above-indentified patent and that said Letters Patent is hereby corrected as shown below:

```
Column 6: line  2; "all" should read "wall"
          line  4; "iwnardly" should read "inwardly"
          line  5; after "wall" please insert ","
          line  7; "configguarion" should read "configeration"
          line 10; "tarvel" should read "travel"
          line 15; "impellin" should read "impelling"
          line 16; "atractive" should read "attractive"
          line 17; "seach" should read "each"
          line 19; "forcek" should read "force"
          line 29; "therbetween" should read "therebetween"

line 37; "rolll" should read "roll"
          line 40; "exending" should read "extending"
          line 47; after "said motors" please insert a comma ","
          line 48; "substanatially" should read "substantially"
          line 50; "bieng" should read "being"
          line 53; "genraly" should read "generally"
          line 57; "mgents" should read "magnets"
          line 60; "exceedig"  should read "exceeding"
Column 7: line  6;  "wheel" should read "wheels"
Cloumn 8: line  2;  "asem-" should read "assem-"
```

Signed and Sealed this

Eleventh Day of April, 1995

Attest:

BRUCE LEHMAN

*Attesting Officer*　　　*Commissioner of Patents and Trademarks*

UNITED STATES PATENT AND TRADEMARK OFFICE
CERTIFICATE OF CORRECTION

| | |
|---|---|
| PATENT NO. | : 5,277,125 |
| APPLICATION NO. | : 07/967661 |
| DATED | : January 11, 1994 |
| INVENTOR(S) | : DiFonso et al. |

It is certified that error appears in the above-identified patent and that said Letters Patent is hereby corrected as shown below:

On the Title Page: Item (75), Inventors, "Gene DiFonso, Arlington; Joel L. Staehs, DeSoto, both of Tex." should read -- Gene DiFonso, Arlington; Joel L. Staehs, DeSoto; William C. Bortzfield *(deceased)*, Grand Prairie, all of Tex.--.

In the claims column 8, line 6, "assemble is" should read -- assemblies --.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 5,277,125 Page 1 of 1
APPLICATION NO. : 07/967661
DATED : January 11, 1994
INVENTOR(S) : DiFonso et al.

It is certified that error appears in the above-identified patent and that said Letters Patent is hereby corrected as shown below:

On the Title Page: Item (75), Inventors, "Gene DiFonso, Arlington; Joel L. Staehs, DeSoto, both of Tex." should read -- Gene DiFonso, Arlington; Joel L. Staehs, DeSoto; Willaim C. Bortzfield (*deceased*), Grand Prairie, all of Tex.--.

Column 8, line 6, "assemble is" should read -- assemblies --.

Signed and Sealed this

Seventeenth Day of April, 2007

JON W. DUDAS
*Director of the United States Patent and Trademark Office*